March 22, 1938.   R. G. McCAMY   2,112,219
TUFTING MACHINE
Filed Aug. 5, 1935
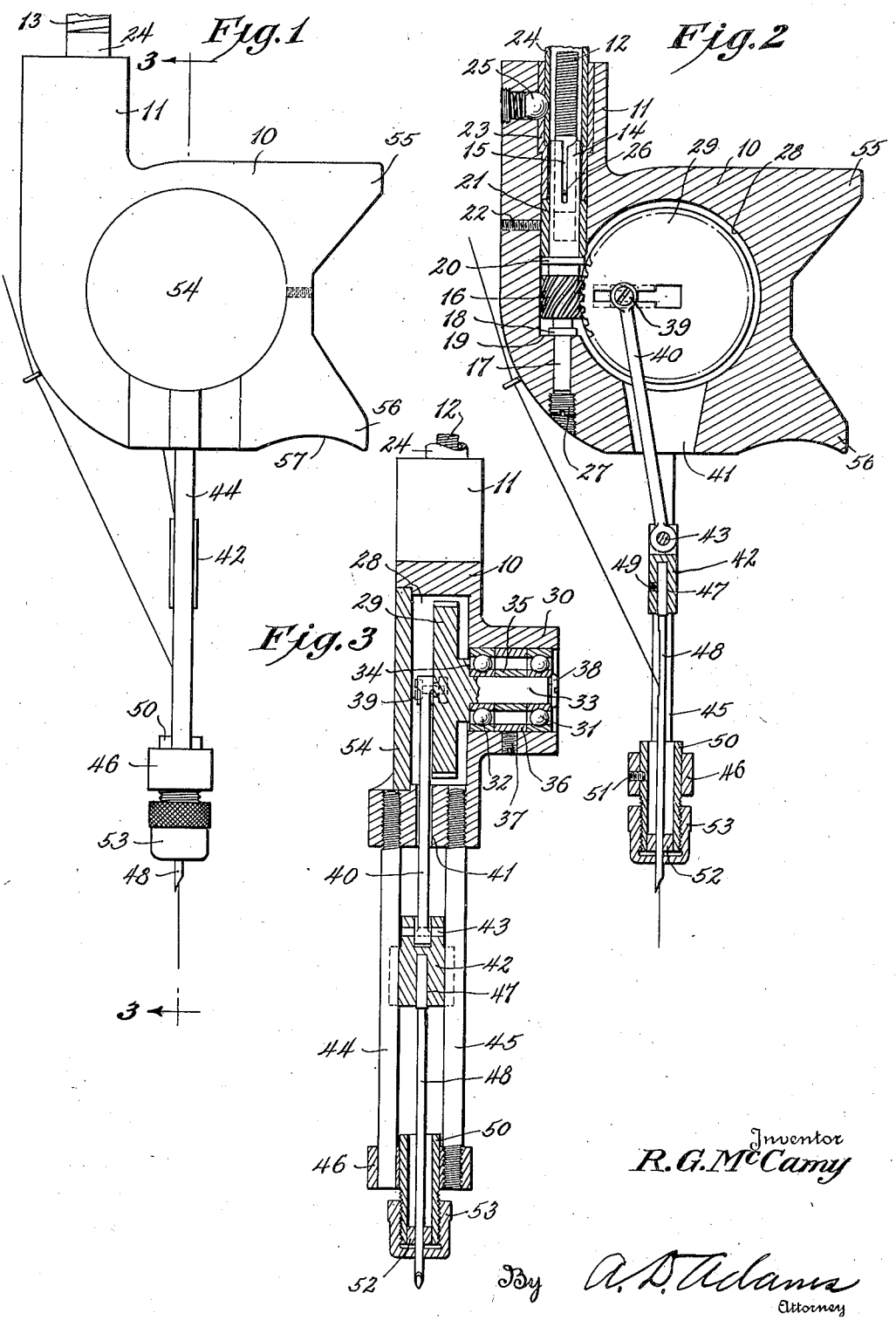
Inventor
R. G. McCamy
By A. D. Adams
Attorney Patented Mar. 22, 1938

2,112,219

UNITED STATES PATENT OFFICE 2,112,219

TUFTING MACHINE

Robert G. McCamy, Dalton, Ga., assignor to Cabin Crafts, Dalton, Ga., a corporation of Georgia Application August 5, 1935, Serial No. 34,807

4 Claims. (Cl. 112—80)

This invention relates to tufting machines such as are used in making tufted designs on woven fabrics and the like and, among other objects, aims to provide a greatly simplified, durable, relatively light and inexpensive machine adapted to be guided by hand over the work and operated by a flexible drive shaft which may be connected to a suspended electric motor or other source of power. One of the main ideas is to provide a simplified gear drive for a tufting needle in which the parts are housed within a casing and provision is made for eliminating excessive wear and vibration incident thereto. Another aim is to reduce the expense of frequent repairs on such machines.

Other aims and advantages of the invention will appear in the specification, when considered in connection with the accompanying drawing, wherein:

Fig. 1 is a side elevation of a machine embodying the invention;

Fig. 2 is a vertical cross sectional view of the machine shown in Fig. 1; and

Fig. 3 is a sectional view taken on the line 3—3 of Fig. 1.

Referring particularly to the drawing, the machine is shown as having a generally rectangular metal casing 10 conveniently made of aluminum or any other light and durable metal, and preferably cast in one piece. It is shown as having a vertical hollow extension 11 at one side to receive a flexible drive shaft 12 which is carried in an armored cable 13. This extension is bored and counterbored to receive a shaft 14 having a key slot 15 and carrying a helical worm 16. This shaft is shown as having an extension 17 in the lower end portion of the casing to provide a lower bearing. It has an annular flange 18 resting on a shoulder 19 in the counterbore or chamber for the worm 16. The shoulder takes the downward end thrust imparted by the worm. Above the worm 16 the shaft has another annular flange 20 which cooperates with a bearing sleeve 21 closely fitted into the bore and held in place by a set screw 22. This sleeve provides a main bearing for the shaft and takes the upward end thrust imparted by the worm.

In the upper end of the bore around the worm shaft 17 there is shown a metal sleeve 23 which is somewhat larger than the shaft to provide a socket of the desired size for the tubular end 24 of the armored cable 13. Incidentally, this sleeve is preferably made of steel or some harder metal than that of the casing to avoid excessive wear. In this instance, the tubular end 24 is adapted to be snapped in place in its socket within the sleeve 23 by means of a spring urged ball 25 which passes through an opening in one side of the sleeve and engages a suitable recess in the tubular end of the cable. When the drive shaft is inserted, a driving pin 26 on its end is guided into the slot 15 by means of a cut away edge on the right hand side of the slot as viewed in Fig. 2, the pin falling into place as the shaft rotates right hand. This pin provides the driving connection between the flexible shaft 12 and the worm 16. To enable the worm, shaft and associated parts to be removed from the bore and counterbore, the bore is extended through the lower end portion of the casing and is conveniently closed by a screw plug 27 which can be removed and the lower end of the shaft or its extension 17 driven upwardly after loosening the set screw 22 and removing the ball 25.

The main body of the casing is shown as having a cylindrical recess 28 to receive a helical gear 29 in the form of a toothed disk which meshes with the helical worm 16 and this gear is directly connected to drive the tufting needle as will hereinafter be explained. The back of the casing has a hollow boss 30 which is bored to receive spaced ball bearings 31 and 32 for a shaft 33 which is integral with the gear 29. In this instance, the gear has a shoulder 34 at the inner end portion of the shaft against which the inner ball retaining ring of the bearing 32 is seated. The two bearings are spaced apart by a pair of spacer rings 35 and 36, one on the shaft and the other closely fitted within the bore and held in place by a set screw 37. The whole thing is held assembled by means of an outer screw 38 in the end of the shaft 33 engaging the outer edge of the inner retaining ring for the bearing 31. Of course, the bearing may be made in other ways, but this arrangement is quite convenient and very effective. The two ball bearings take all of the thrust on the shaft and practically eliminate wear.

The helical gear 29 is directly connected to reciprocate the needle by means of a crank pin 39 adjustably connected to the gear conveniently in a radial T-slot (Fig. 2), it being understood that the stroke may be varied by securing the crank pin at different distances from the center of the gear. A connecting rod 40 is connected to the crank pin and projects through a suitable opening 41 in the lower end portion of the casing, being connected to a substantially rectangular crosshead 42 by means of a pin 43. In this instance, the crosshead 42 is guided between a pair of spaced steel rods 44 and 45, both of which are screw threaded in the lower end of the casing, as shown in Fig. 3. These guide rods are connected at their lower ends to a block 46, one of the rods being shown as being screw threaded into the block and the lower end of the other rod closely fitted in an opening through the block. However, these rods may be connected to the block in any other suitable manner. The crosshead is shaped at its opposite edges to conform to the rods and be guided thereby and has a needle socket 47 to receive the usual hollow needle 48 which is secured therein by a set screw 49 and projects through a tubular sleeve 50 secured in the block 46 by a set screw 51. Thus, the crosshead and the needle are always easily accessible.

The lower end of the sleeve 50 is shown as carrying a guiding bushing 52 for the needle and the outer face is screw threaded to receive an adjustable foot piece in the form of a knurled thimble 53. The arrangement is such that the effective stroke of the needle may be varied as desired by adjusting the foot piece on the lower end of the sleeve, it being understood that the foot piece is held against the work as the machine is moved over the fabric along the design made on it.

If desired, the gearing may be entirely closed within the casing by securing a cover in the form of a disk 54 in the recess 28 for the helical gear. While this disk may be screw threaded, it is shown as being closely fitted in the recess and held in place by a set screw as indicated in Fig. 1. It is easily removable so that the operating parts are accessible and can be lubricated by means of heavy grease or the like which will not readily run out of the casing on the fabric.

In this instance, the casing is shown as having a novel hand grip in the form of spaced lateral projections 55 and 56 on the side opposite from the extension 11. The bottom face of the lower projection is curved at 57 to provide a convenient finger grip so that the machine may be held securely in one hand in somewhat the same manner as a pistol.

From the foregoing description, it will be seen that the machine is simple in its design. The number of parts is reduced to a minimum. It is very easy to manufacture and assemble. There are no working parts subjected to excessive wear and requiring quick replacements.

Obviously, the present invention is not restricted to the particular embodiment thereof herein shown and described. Moreover, it is not indispensable that all the features of the invention be used conjointly, since they may be employed advantageously in various combinations and sub-combinations.

What is claimed is:

1. In a tufting machine of the class described, a casing; a worm mounted in one side of the casing having a shaft adapted to be driven by a flexible shaft; a worm wheel within the casing having a shaft projecting through one side of the casing; a hollow boss on the casing about said shaft; a pair of spaced anti-friction bearings on said shaft within the boss; a crosshead carrying a tufting needle; guide members for said crosshead secured to the lower end of the casing; a connecting rod directly connecting said worm wheel to said crosshead; and an adjustable foot piece for the needle supported by said guide members.

2. In a tufting machine of the class described, a generally rectangular casing; a vertical extension arranged on one side of the casing; a worm mounted in said casing having a shaft in said vertical extension; a flexible shaft adapted to be connected to said worm shaft; a worm wheel mounted in said casing; a shaft carrying said worm wheel having anti-friction bearings in the casing; a crosshead carrying a tufting needle; a pair of guide rods for said crosshead secured to the lower end of the casing; a connecting rod directly connecting said worm wheel to said crosshead; and a needle guide carried by the lower ends of said guide rods.

3. In a tufting machine of the class described, a metal casing; a worm and wheel mounted in said casing and adapted to be driven by a flexible shaft; a crosshead carrying a needle; a connecting rod connecting the worm wheel to said crosshead; crosshead guide members secured to the casing; and an adjustable footpiece mounted at the lower ends of said crosshead guide members.

4. In a tufting machine of the class described, a substantially rectangular casing having an integral vertical extension at one side; a bore and counterbore in the vertical extension; a worm mounted on a shaft within the vertical extension; a worm wheel within the casing having an integral shaft projecting through one side of the casing; a hollow boss on the casing around the shaft; spaced ball bearings within the boss for said worm wheel shaft; means for retaining the shaft and bearings in their proper positions; a connecting rod on the worm wheel projecting through an opening in the lower end of the casing; a crosshead on the connecting rod having a socket for a tufting needle; a pair of crosshead guide rods screw threaded into the lower end of the casing; a block on the lower ends of said crosshead guide rods; a needle guide carried by said block; and an adjustable foot piece screw threaded on said needle guide.

R. G. McCAMY.